United States Patent [19]
Seith

[11] Patent Number: 6,105,742
[45] Date of Patent: Aug. 22, 2000

[54] CLUTCH RINGS AND OVERRUNNING CLUTCH INCORPORATING SAME

[75] Inventor: Warren A. Seith, Bethlehem, Pa.

[73] Assignee: Ingersoll-Rand Company, Woodcliff Lake, N.J.

[21] Appl. No.: 09/228,370

[22] Filed: Jan. 12, 1999

[51] Int. Cl.[7] .......................... F16D 11/04; F16D 11/10; F16D 13/22
[52] U.S. Cl. ............................. 192/46; 192/69
[58] Field of Search ................. 192/69, 46, 42, 192/63; 74/6, 7, 459.5

[56] References Cited

U.S. PATENT DOCUMENTS

| | | | |
|---|---|---|---|
| 2,602,335 | 7/1952 | Miller | 74/7 |
| 3,187,870 | 6/1965 | Sabatini | 192/42 |
| 3,263,509 | 8/1966 | Digby | 74/6 |
| 3,300,006 | 1/1967 | Digby | 192/63 |
| 3,306,409 | 2/1967 | Giometti | 192/46 |
| 3,319,755 | 5/1967 | Digby | 192/42 |
| 3,712,434 | 1/1973 | Anderson et al. | 192/53 E |
| 3,714,834 | 2/1973 | Digby | 74/6 |
| 3,760,642 | 9/1973 | Stamm | 74/432 |
| 3,927,537 | 12/1975 | Anderson et al. | 192/56 |
| 4,261,452 | 4/1981 | Barrows | 192/42 |

FOREIGN PATENT DOCUMENTS 1 420 081  1/1976  United Kingdom ............. 192/46

*Primary Examiner*—Rodney H. Bonck
*Assistant Examiner*—Tisha D. Waddell
*Attorney, Agent, or Firm*—Leon Nigohosian, Jr.

[57] ABSTRACT

Provided are a clutch ring and an overrunning clutch designed for use with engine starters and the like incorporating a plurality of teeth having ramped surfaces with a helical geometry. Also provided are a clutch ring and an overrunning clutch having teeth with profiles that are crowned.

8 Claims, 5 Drawing Sheets

CLUTCH RINGS AND OVERRUNNING CLUTCH INCORPORATING SAME

FIELD OF THE INVENTION

This invention relates to devices, such as engine starters, which require a means to allow starter torque to be applied in one direction of rotation while permitting an overrun condition in the same direction of rotation after the engine has started.

BACKGROUND OF THE INVENTION

Overrunning clutch devices typically are used with engine starters to allow the starter to transmit torque in one direction during cranking and to disengage when the engine starts, thereby protecting the starter from overspeed. These clutches typically comprise a face clutch containing circular teeth cut with a negative angle used for engagement on one side and a small positive angle on the other side which separates and disengages the clutch halves during overrun. Face jaws of this type are well known in the art and are designed to have planar, i.e., flat, mating surfaces which are convenient to manufacture. During operation of the clutch, however, collisions between mating clutch teeth having planar faces creates fatigue wear.

The foregoing illustrates limitations known to exist in present overrunning clutch devices. Thus, it is apparent that it would be advantageous to provide an alternative directed to overcoming one or more of the limitations set forth above. Accordingly, an alternative overrunning clutch device is provided including features more fully disclosed hereinafter.

SUMMARY OF THE INVENTION

The present invention was developed in view of the above-mentioned problems, and is thus aimed at providing a clutch ring and an overrunning clutch designed for use with engine starters and the like incorporating a plurality of teeth having ramped surfaces with a helical geometry. Also provided are teeth having profiles that are crowned. It is to be understood that both the foregoing general description and the following detailed description are exemplary, but are not restrictive, of the invention. The foregoing and other aspects will become apparent from the following detailed description when read in conjunction with the accompanying drawing figures.

DETAILED DESCRIPTION OF THE INVENTION

Figure 1:
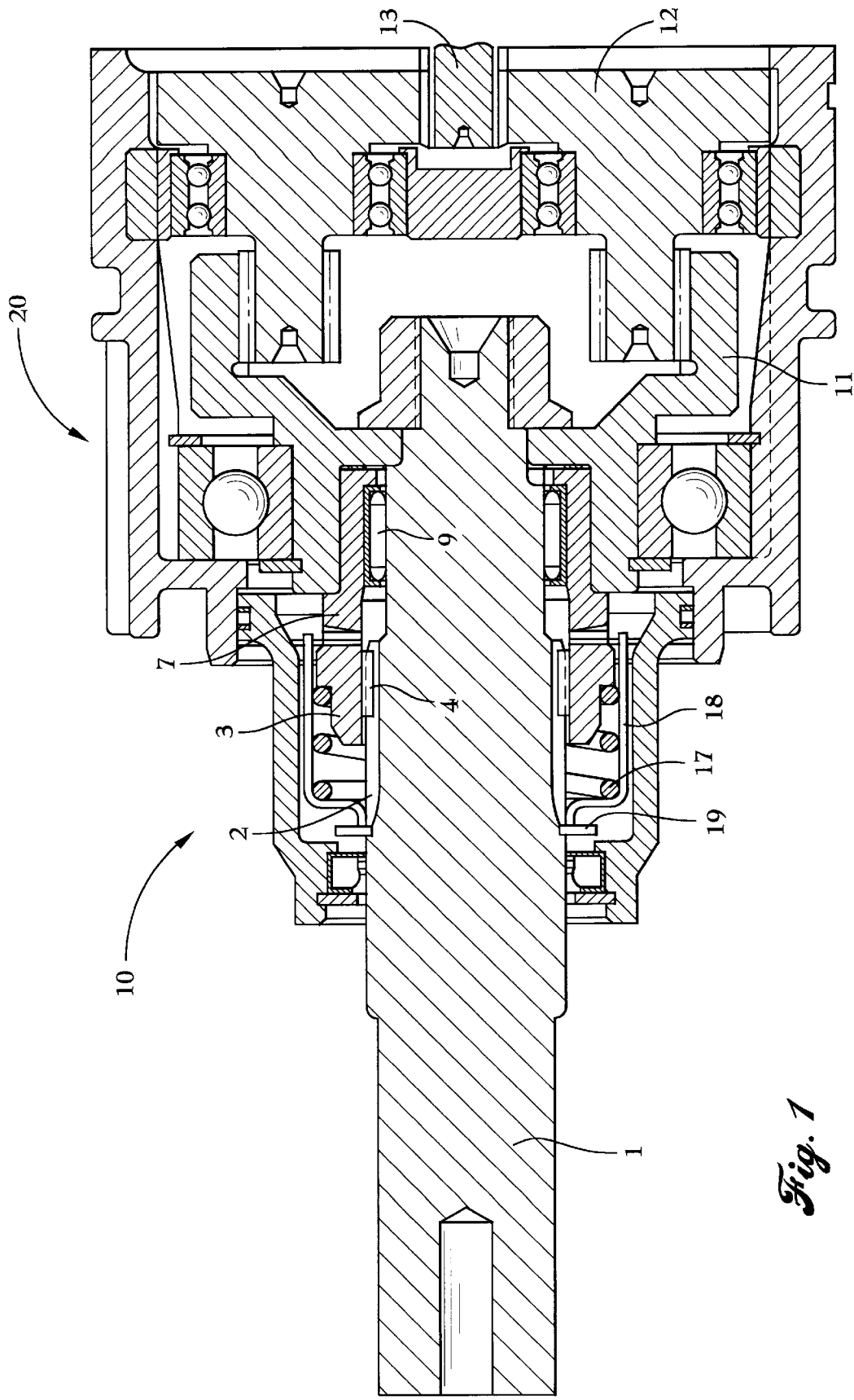
FIG. 1 is a cross-sectional axial view of the overrunning clutch having clutch rings according to the present invention.

The following description is provided in order to fully understand the nature of the invention. Although it will be described in terms of an air starter overrunning clutch, it should be understood that the clutch device is equally applicable to electric starters or other similar devices requiring overrun capability. The overrunning clutch device according to the present invention is best understood from the following detailed description when read in connection with the drawing figures in which like reference numerals refer to like elements throughout. It is emphasized that according to common practice, the various dimensions of the apparatus shown in the drawings are not to scale.

Referring now to the drawings, FIG. 1 shows an output shaft 1 which extends horizontally through the axial center of an overrunning clutch device designated generally by the reference numeral 10. Output shaft 1 is rotated or driven by any conventional drive means, such as an air or electric motor, and may be driven through any suitable gear or other reduction means designated generally by reference numeral 20. Motor reduction gear means 20 typically includes a ring gear 11 concentrically mounted on output shaft 1 with a planetary gear 12 connecting ring gear 11 to the shaft 13 of a turbine motor (not shown). It is sufficient to understand for the purpose of this invention that output shaft 1 is rotated in a given direction at a speed which, in the case of an air starter or electric starter, is sufficient to rotate the engine to its starting speed. As will be readily recognized by those skilled in the art, a starting pinion (not shown) is attached to the left hand side of output shaft 1, as shown in FIG. 1, for engaging a flywheel or similar connection of the engine to be started. The axial translation of output shaft 1 may be accomplished by any conventional means, such as a mechanical fork and linkage arrangement or a solenoid or air piston arrangement as conventionally used in positive engagement starters.

Figure 2:
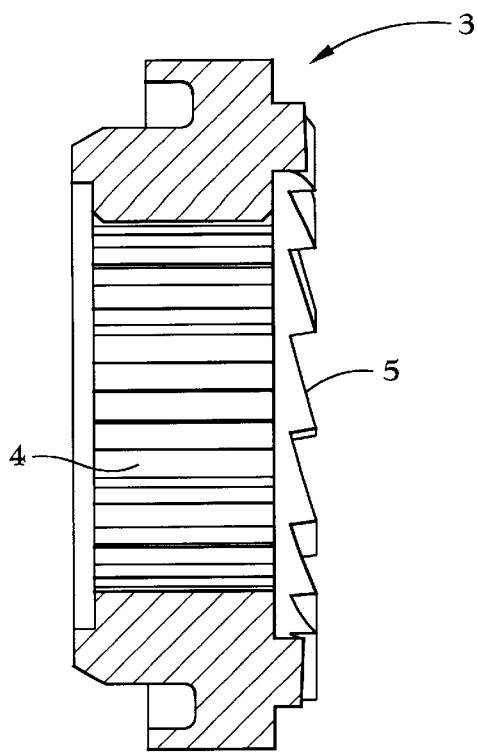
FIG. 2 is a partial side sectional view of a driven clutch ring shown in FIG. 1.
Figure 3:
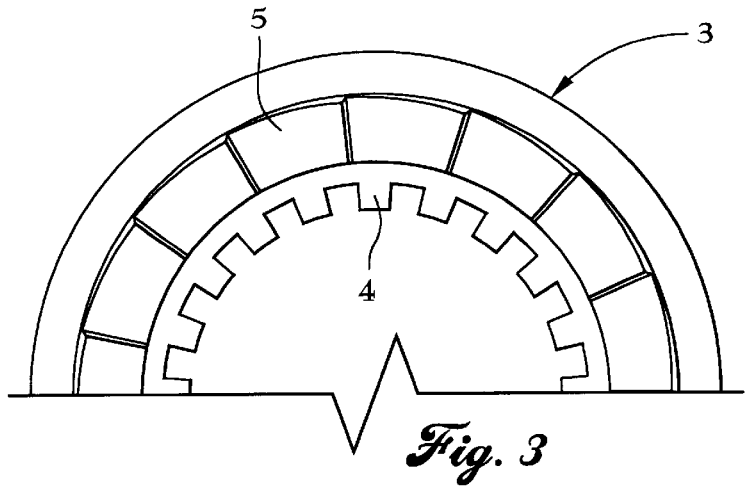
FIG. 3 is a partial end elevation view of the driven clutch ring shown in FIG. 2.

Moving toward the right-hand end of output shaft 1, a spline 2 is shown provided which engages a driven clutch ring 3. Driven clutch ring 3 is best shown by FIGS. 2 and 3 and is a ring-shaped member that is provided with a mating spline 4 on its inner surface which contacts and is driven by spline 2. It will be appreciated by one skilled in the art that the use of the splines 2 and 4 allow the free axial translation of driven clutch ring 3 relative to output shaft 1.

Figure 4:
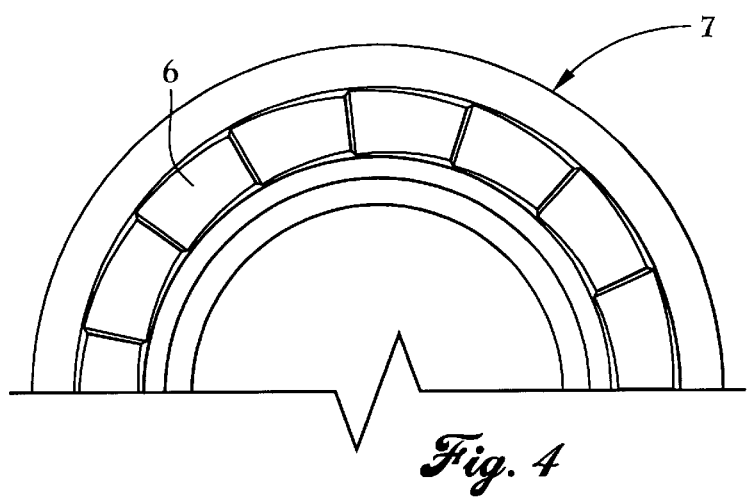
FIG. 4 is a partial end elevation view of the driving clutch ring shown in FIG. 1.

The right-hand side of driven clutch ring 3, as shown in FIG. 1, is provided with a driven face jaw 5 having a plurality of teeth which can best be seen by the side elevation in FIG. 2 and the end elevation in FIG. 3. Driven face jaw 5 mates with a driving face jaw 6 provided on a driving clutch ring 7 shown in FIG. 4 which is rotatably and concentrically mounted to the right of driven clutch ring 3 on output shaft 1 by a needle bearing 9. The nature of the teeth geometries of face jaws 5 and 6 of the driven and driving clutch rings, respectively, according to the present invention is described in detail below and shown in the schematic diagram in FIG. 5 which illustrates the tooth profile geometry.

In its engaged position as shown in FIG. 1, the driven clutch ring 3 is forced to the right against the driving clutch ring 7 by means of a return spring 17, which is retained in a spring cup 18, which is in turn retained in the motor reduction gear assembly 20 by means of a snap ring 19. In driving operation when viewed from the left as shown in FIG. 1, the driving clutch ring 7 is rotated clockwise by turbine motor shaft 13 via the motor reduction gear assembly 20, and the output shaft 1 is likewise driven clockwise at the same speed as the driving clutch ring 7 by means of the face jaw clutch driving through, in turn, driving clutch ring 7, driving face jaw 6, driven face jaw 5, driven clutch ring 3, spline 4, spline 2, and finally output shaft 1. The driven clutch ring 3 is held in contact with the driving clutch ring 7 by means of return spring 17 which produces a force which urges the driven clutch ring 3 to the right as shown in FIG. 1. This is the typical starting mode.

Operation of the air starter motor is initiated after engaging a starter pinion with an engine flywheel (not shown) and initiating rotation of the starter motor turbine shaft 13 and all drive train components of the motor reduction gear housing assembly 20. Torque from the starter is transmitted through the overrunning clutch 10 to output shaft 1 and ultimately to the engine flywheel (not shown). Once the engine starts, it will be appreciated by one skilled in the art that the engine flywheel begins to overrun the air starter motor and rotates the output shaft 1 at a speed greater than that of the driving clutch ring 7. In doing so, the driven clutch ring 3 turns relative to the driving clutch ring 7. Because the driven clutch ring 3 is connected by spline 4 to spline 2 of output shaft 1, it moves axially away (to the left) from the driving clutch ring 7. This disengages the driving clutch ring 7 and driven clutch ring 3 from each other thereby protecting the starter from dangerously high overspeeds. While the engine is driving the output shaft 1 at high speed, the overrunning clutch 10 remains disengaged. However, the driven clutch ring 3 oscillates back and forth along the output shaft 1 against the force provided by return spring 17 causing it to ramp off the jaw teeth and slide axially away from the driving clutch ring 7 until return spring 17 forces it back. This oscillation of the driven clutch ring continues until the air starter is turned off by the operator causing it to retract from the engine which has started.

In order to prevent excessive wear between the driving face jaw 6 and the driven face jaw 5 each time they collide during an overrunning condition of the overrunning clutch 10, according to the present invention face jaws having helical tooth geometries described in greater detail below are provided which ensure that substantially continuous contact occurs between the colliding surfaces. The present inventor has discovered that these surface geometries provide substantially continuous contact throughout their relative range of motion that helps to distribute and dissipate the impact energy between the colliding surfaces. As a result wear and fatigue of the clutch ring jaw faces are reduced.

Figure 5:
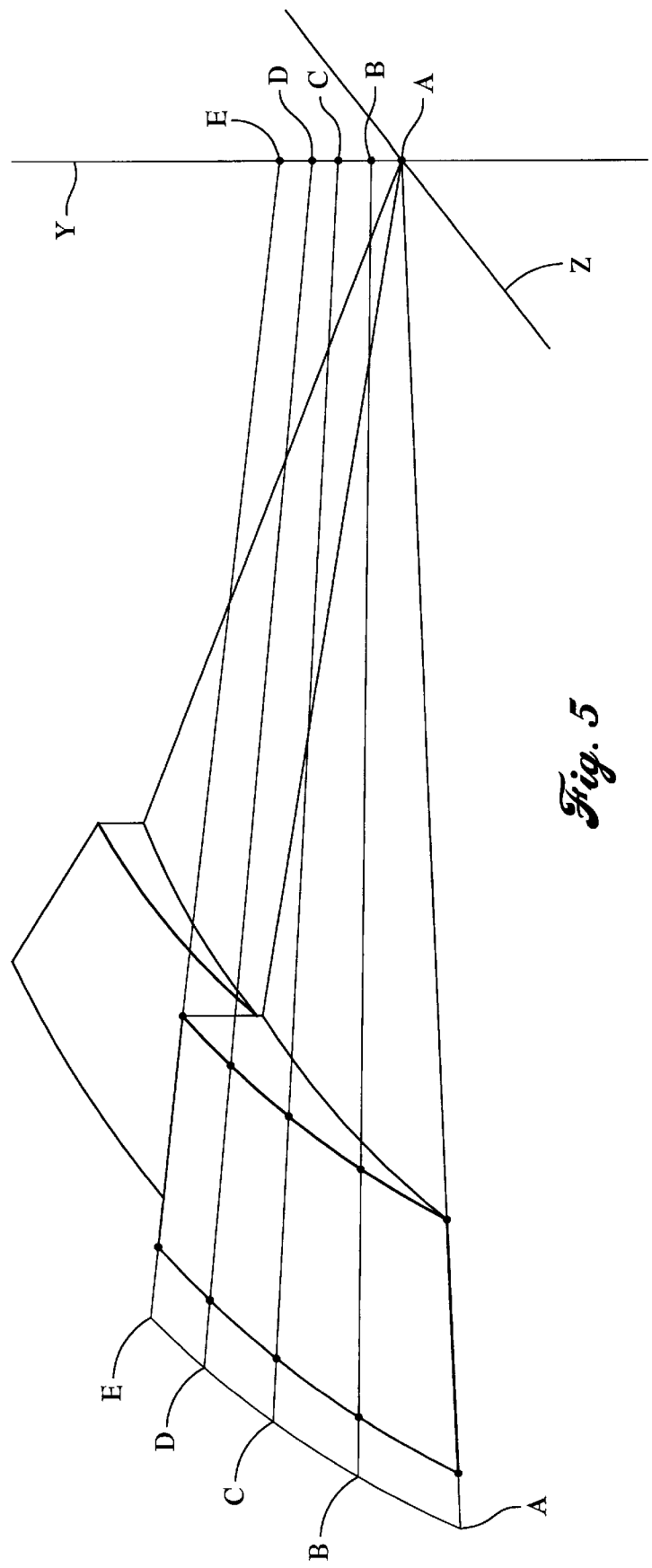
FIG. 5 is a planar schematic of a tooth profile for the driven and driving face jaws according to one embodiment of the present invention.

The overrunning clutch design, according to the present invention, provides substantially continuous contact across the mating surfaces of the face jaws throughout their relative range of motion. Shown in FIG. 5 is a schematic representation of the geometry of the ramped helical tooth surfaces of driven face jaw 5 and driving face jaw 6 according to the present invention. These face jaw tooth surfaces are shown and may be described by a helix generated by a line normal to the axis of rotation of the clutch ring and simultaneously rotated about and advanced along the axis of rotation of the clutch ring at a constant rate. The helical surface that is generated maintains area contact between the clutch ring halves as the driven clutch ring rotates relative to the driving clutch ring. During overrun of this design, the impact force generated during collison is distributed over the contact area between the surface and is easily withstood by the jaw material without fatigue. As illustrated by the schematic representation of FIG. 5, the lines A—A, B—B, C—C, D—D and E—E demarcate this helical surface as they are rotated about and pass through the axis of rotation of the clutch ring designated as the Y-axis. Preferably, the lift for the helical surface is defined by the following lift table which gives the lift at each of the lines A—A, B—B, C—C, D—D and E—E, respectively, as they are rotated around the axis of rotation of the clutch ring:

| Angle (Degrees) | Lift (Inches) |
|---|---|
| 0 | .0000 |
| 9 | .0262 |
| 18 | .0525 |
| 27 | .0787 |
| 36 | .1049. |

Figure 6:
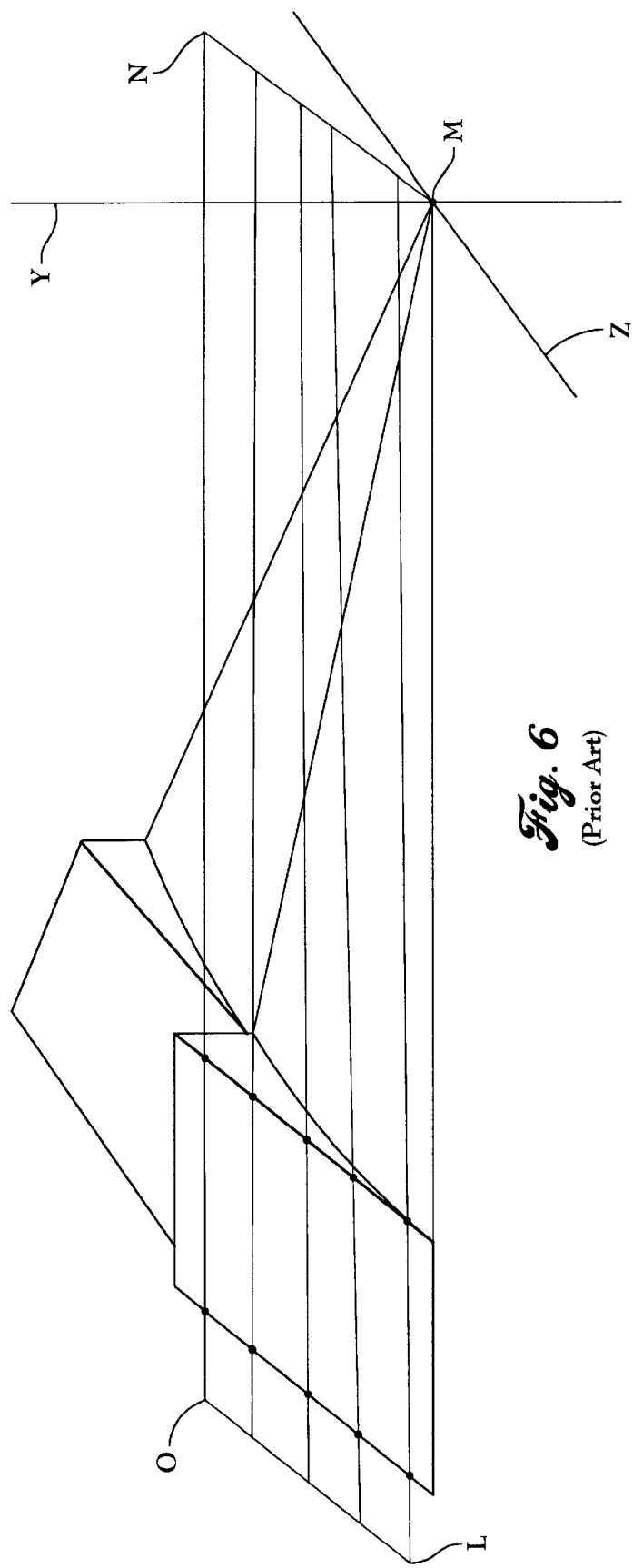
FIG. 6 is a planar schematic of a tooth profile for the driven and driving face jaws according to the prior art.

Although not intending to be bound by or otherwise limited to any theory, the helical tooth surfaces of the present invention improve clutch life by eliminating the point contact which occurs between mating surfaces between clutch halves in conventional clutch assemblies. Shown in FIG. 6 is a schematic representation of a conventional overrunning clutch jaw face having a planar tooth geometry (designated by the points LMNO) which causes excessive wear. This wear is attributed to high stresses created during overrunning caused by point contact which occurs between the mating planar surfaces of conventional clutch halves during overrun collisions. More specifically, conventional clutch designs having flat surfaces are only engaged in planar contact while the clutch is transmitting torque in the engaged position. At any other relative angle between the clutch halves, contact occurs between the clutch halves at a point between their faces. As a result of the point contact between mating clutch halves, when a conventional clutch is disengaged in the overrun mode, the moving clutch half begins "ski jumping" off the stationary halve. The relative orientation of the teeth between the halves when the collision occurs is completely random. Because the only position that provides planar contact between the clutch halves is when the clutch is in the parked/driving orientation, these collisions necessarily occur with point contact on the tooth faces. The collisions are elastic and therefore launch the moving halve at a high velocity up against the limit of travel which is also an elastic collision. This oscillation occurs at a high frequency and can quickly fatigue the material.

Figure 7:
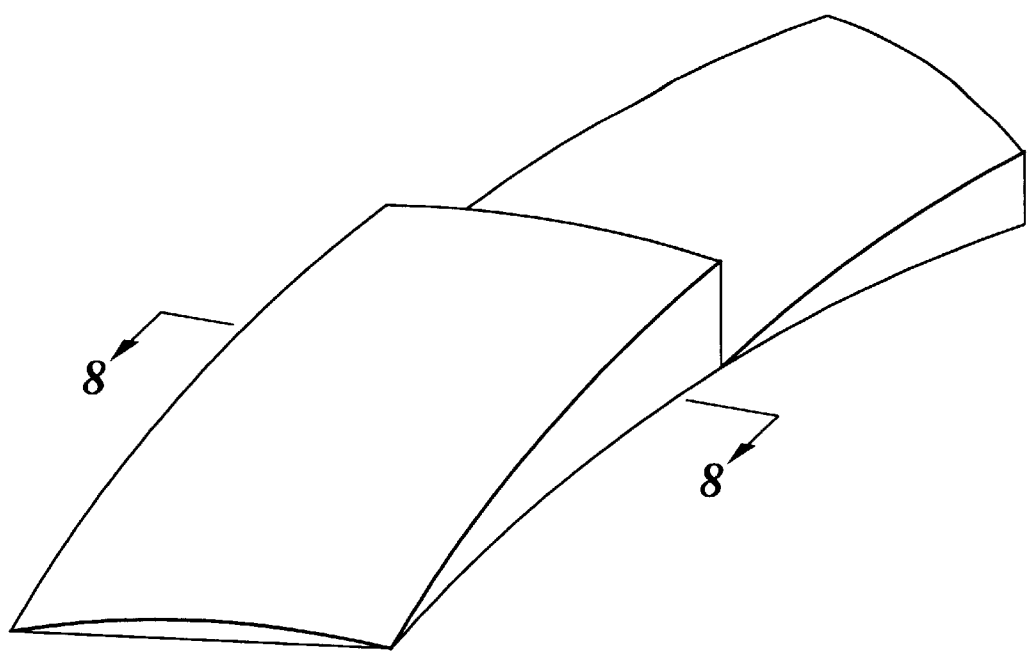
FIG. 7 is a planar schematic of a tooth profile for the driven and driving face jaws according to an alternative embodiment of the present invention.
Figure 8:
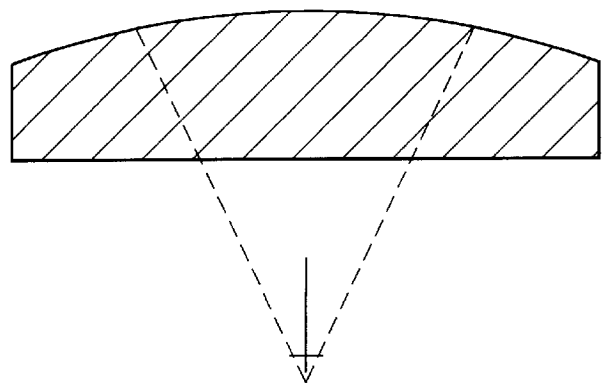
FIG. 8 is a cross-sectional view of the tooth profile shown in FIG. 7 taken along the line "8—8".

Shown in FIGS. 7 and 8 is an alternative embodiment according to the present invention which is substantially the same as the embodiment shown and described above with respect to FIGS. 1–5 with the modification that the cross-sectional tooth profile of the face jaws is crowned. By crowning the helical tooth surface, this configuration ensures that impact loads between the face jaws is centered and delivered away from the edges of the tooth faces, as illustrated by the dashed lines in FIG. 8. This configuration is particularly useful in compensating for manufacturing defects in the tooth profiles of the face jaws that would cause stress concentrations at the edges of the teeth. By centering the impact forces on the tooth faces the bulk of the tooth material withstands the impact forces such that stress concentrations which may be caused by any manufacturing defect in the helical surface does not cause breaking of the corners of the teeth.

Although illustrated and described herein with reference to certain specific embodiments of an overrunning clutch device, the present invention is nevertheless not intended to be limited to the details shown. Rather, it will be readily understood based on and upon reading the teachings of this disclosure, that other various modifications may be made in the details in the scope and range of equivalents of the claims without departing from the spirit of the invention.

What is claimed is:

1. A clutch ring for an overrunning clutch comprising:

a plurality of teeth having a ramped surface with a helical geometry defined by a helix generated by a line normal to an axis of rotation of said clutch ring, said line being simultaneously rotated about and advanced along the axis of rotation of the clutch ring at a constant rate.

2. The clutch ring according to claim 1, wherein said clutch ring is a driven clutch ring.

3. The clutch ring according to claim 1, wherein said clutch ring is a driving clutch ring.

4. The clutch ring according to claim 1, wherein said helical geometry is defined by a surface generated by a line rotated about said axis of rotation of said clutch ring and elevated according to the following lift profile:

| Angle (Degrees) | Lift (Inches) |
|---|---|
| 0 | .0000 |
| 9 | .0262 |
| 18 | .0525 |
| 27 | .0787 |
| 36 | .1049 |

5. The clutch ring according to claim 1, wherein said teeth have a cross-sectional profile which is crowned.

6. An overrunning clutch comprising:

a driving clutch ring and a driven clutch ring having a common axis of rotation; and a plurality of mating teeth disposed on each of said driving clutch ring and said driven clutch ring, said plurality of teeth having a ramped mating surface with a helical geometry defined by a helix generated by a line normal to said line of rotation, said axis being simultaneously rotated about and advanced along the axis of rotation of the clutch ring at a constant rate.

7. The overrunning clutch according to claim 6, wherein said helical geometry is defined by a surface generated by a line rotated about said axis of rotation and elevated according to the following lift profile:

| Angle (Degrees) | Lift (Inches) |
|---|---|
| 0 | .0000 |
| 9 | .0262 |
| 18 | .0525 |
| 27 | .0787 |
| 36 | .1049 |

8. The overrunning clutch according to claim 6, wherein said teeth have a cross-sectional profile which is crowned.

* * * * *

UNITED STATES PATENT AND TRADEMARK OFFICE
CERTIFICATE OF CORRECTION

PATENT NO. : 6,105,742
DATED : August 22, 2000
INVENTOR(S) : Warren A. Seith

It is certified that error appears in the above-identified patent and that said Letters Patent are hereby corrected as shown below:

Claim 6, line 9, delete "axis", and insert -- line --.

Signed and Sealed this

Seventeenth Day of April, 2001

Attest:

NICHOLAS P. GODICI

Attesting Officer     Acting Director of the United States Patent and Trademark Office